United States Patent Office 3,804,897
Patented Apr. 16, 1974

3,804,897
SYNTHESIS OF ACRYLAMIDE FROM
ACRYLONITRILE
Louis R. Haefele and Harvey J. Young, Winston-Salem,
N.C., assignors to R. J. Reynolds Tobacco Company,
Winston-Salem, N.C.
No Drawing. Filed July 30, 1971, Ser. No. 167,845
Int. Cl. C07c 103/08
U.S. Cl. 260—561 N          4 Claims

ABSTRACT OF THE DISCLOSURE

Conversion of acrylonitrile and methacrylonitrile to the respective amides using manganese dioxide as a catalyst with the introduction of oxygen to increase useful catalyst life.

---

This invention relates to improvements in the art of converting nitriles to amides and more particularly it relates to an improved process for converting acrylonitrile or methacrylonitrile to acrylamide or methacrylamide.

U.S. Pat. No. 3,366,636 which issued Jan. 30, 1968 relates to the conversion of nitriles in general to amides using manganese dioxide. Also, copending application Ser. No. 66,191, filed Aug. 24, 1970 relates to an improved process which can be carried out in a continuous manner to convert nitriles to amides.

It is a principal object of this invention to provide a process for synthesizing acrylamide from acrylonitrile or methacrylamide from methacrylonitrile using manganese dioxide wherein the useful life of the manganese dioxide catalyst is increased. In the interest of brevity we will refer herein only to acrylonitrile, it being understood that methacrylonitrile can be substituted therefor to produce methacrylamide.

In accordance with the present invention, acrylonitrile is converted to acrylamide using manganese dioxide as a catalyst for the conversion with the efficiency or life of the manganese dioxide catalyst being increased by contacting it with oxygen or an oxygen-containing gas. In a particularly preferred embodiment of the invention an amine is employed in addition to oxygen.

In carrying out the process of the present invention acrylonitrile dissolved in water is contacted at an elevated temperature with the manganese dioxide catalyst for a sufficient length of time so that the acrylonitrile is converted to acrylamide. The conversion can be carried out in any convenient manner either as a batch operation or in continuous manner as disclosed, for example, in copending application Ser. No. 66,191. In any event, oxygen or an oxygen-containing gas such as air is brought into contact with the manganese dioxide catalyst either intermittently during cyclic operation or continuously during the conversion such as by passing a stream of the oxygen-containing gas through the aqueous acrylonitrile solution when in contact with the solid manganese dioxide catalyst. Various known expedients can be employed to insure good distribution of the oxygen throughout the catalyst. According to a particularly preferred embodiment of the invention, an inert amine is incorporated in the aqueous acrylonitrile solution which is brought into contact with the manganese dioxide catalyst.

The temperature at which the conversion is carried out can vary so long as temperatures substantially above ambient are employed. To achieve practical rates of reaction, generally temperatures in the range of about 70 to 100° C. at atmospheric pressure are utilized. It is generally preferred to employ a relatively highly saturated aqueous solution of acrylonitrile and to conduct the reaction for a sufficient length of time to achieve desired yields of acrylamide. The reaction period or flow rate of the liquid solution will vary somewhat depending upon such factors as the relative activity of the catalyst, the reaction temperature and the like. Generally, the conversion of acrylonitrile to acrylamide by the process of this invention is accomplished in relatively short periods of time, such as a few hours or less, say 1 to 6 hours, although longer periods can be employed.

Activated manganese dioxide, either anhydrous or hydrated, can be employed in the process of the invention preferably in granular or pelleted form so as to achieve good contact of the aqueous nitrile solution therewith. When the conversion is conducted by passing the aqueous acrylonitrile solution through a bed of manganese dioxide it is preferred that the particles of manganese dioxide be such as to be maintained on a 40 mesh screen (U.S. Series). Generally, desirable flow rates through a bed of manganese dioxide particles can be realized by incorporating therewith inert materials such as glass beads or helices, silica gel, diatomaceous earth and the like.

After contact of the aqueous acrylonitrile solution with the manganese dioxide catalyst the acrylamide product can be separated from any unreacted nitrile, amine and water by known procedures such as distillation, evaporative concentration, crystallization and the like. For some applications, the product solution can be used as is without isolation of the acrylamide product.

The amount of oxygen employed in accordance with the present invention is dependent upon a number of interrelated factors. These factors include the particle size and shape of the manganese dioxide catalyst, the particular means employed to disperse the oxygen-containing gas in the liquid reaction mixture, the solubility of oxygen in that mixture, which in turn depends upon such factors as temperature, pressure and the composition of the liquid as well as the design and configuration of the reactor used. In practice it is well within the routine skill of the art to determine optimum oxygen requirements by empirical means for a particular operation. In general, the quantity of oxygen employed will be somewhat greater than the amount ordinarily dissolved in the aqueous acrylonitrile solution at ambient temperature and pressure. In the embodiment of the invention where the oxygen-containing gas is passed continuously through the reaction solution in contact with the catalyst, the flow-rate of the gas is preferably maintained below a value where the rate of conversion to acrylamide is decreased below a useful level due to channeling in the catalyst bed. Generally, the oxygen flow should be maintained at a rate to provide an oxygen residence time corresponding to about 0.1 to 0.001 times the residence time of the aqueous acrylonitrile solution. In the case of intermittent operation, sufficient oxygen is supplied to the catalyst to give adsorbed oxygen quantities in excess of that normally present on the dry catalyst surface when it is in equilibrium with air.

When operating according to a particularly preferred embodiment of the invention, an amine is employed in the aqueous acrylonitrile feed solution. The amine component of the reaction mixture must be inert under the reaction conditions. Thus, it must be stable in the presence of water and manganese dioxide at the reaction temperature. In general, tertiary aliphatic, aromatic and heterocyclic amines are sufficiently inert for this purpose provided they do not contain an oxidizable substituent in the molecule, such as, for example, methyl substituted aliphatic or aromatic amines. In addition, certain hindered primary and secondary aromatic and aliphatic amines are also useful. In practice, it is preferable that the amine employed have sufficient solubility in the acrylontrile feed solution so as to enhance the effective life of the catalyst and at the same time be readily recoverable from the product mixture so that it can be recycled for further use. Representative examples of amines useful in the present process are pyridine and substituted derivatives thereof such as the picolines, collidines, quinolines and the like; tertiary aliphatic amines such as triethylamine, tripropylamine and functionally substituted derivatives such as nitrilotripropionitrile and aromatic secondary and tertiary amines such as diphenylamine, N-phenyl-2-naphthylamine, N-phenylpyrrole, N,N-diethylaniline and so forth.

The concentration at which the amine component is used is dependent upon the nature of the amine used. Triethylamine, for example, in conjunction with oxygen, is quite effective for enhancing catalyst efficiency at its saturation concentration of 1.5%. Pyridine, on the other hand, is most effective at a concentration of 10% under otherwise comparable conditions and enhancement of catalyst life is minimal at a pyridine concentration of 1%, while little effect of additional pyridine is noted above the 10% level. Pyridine has the advantages, however, in that it is completely miscible with the nitrile-water mixture and it is readily recovered and recycled.

The following numbered examples illustrate the advantages of the present invention.

EXAMPLE I

A continuous-flow, stainless steel reactor (¾ inch x 40 inches) was charged with 750 grams of a commercially produced, granular manganese dioxide catalyst (Lavinore A—E. J. Lavino Co.). A solution, 5.3% by weight of acrylonitrile in water was pumped into the bottom of the reactor at a flow rate of 93.7 milliliters/hour. The apparatus was maintained at 70° C. by circulating hot water to the jacket. Fractions of the effluent solution were collected at intervals and samples were analyzed for acrylamide using gas chromatography.

The process was run continuously for 98.2 hours during which time a total of 156 grams of acrylamide had been produced for an overall conversion of 23.9%. The initial conversion rate was 57.2%, decreasing to 8.4% at the completion of the operation. The catalyst half-life was found to be 91.5 grams of acrylamide or 0.12 gram of acrylamide per gram of catalyst.

EXAMPLE II

Using the same apparatus, the general procedure of Example I was followed except that a stream of air at ambient pressure was introduced into the feed solution at the bottom of the reactor. The air flow rate was maintained at approximately 5.5 liters/hour and the liquid flow at 96.1 milliliters/hour. From an initial value of 18.8%, the conversion decreased to 9.6% after 195.0 hours and having produced 182 grams of acrylamide (13.6% overall). The catalyst half-life was determined to be 185 grams of acrylamide or 0.25 gram of product per gram of catalyst.

EXAMPLE III

Using the same apparatus, the general procedure of Example II was followed except that the feed solution was composed of acrylonitrile, pyridine and water in a weight ratio of 5.3:10:84.7. The liquid flow rate was 95.2 milliliters/hour and the air flow was 2.4 liters/hour. After 380.6 hours, 928 grams of acrylamide had been obtained for an overall conversion of 36.0%. The rate of conversion had decreased to 26.2% from an initial value of 50.5%. The catalyst half-life was determined to be 965 grams of acrylamide or 1.3 grams of product per gram of catalyst.

EXAMPLE IV

Example III was essentially repeated except that oxygen gas was employed at a flow rate of 5.5 liters/hour. The liquid flow was 94.9 milliliters/hour. The initial conversion was 34.0%, decreasing to 25.6% after 351.6 hours of operation during which 681 grams of acrylamide was produced. The overall conversion was 28.7% and the catalyst half-life was 1380 grams of product or 1.8 grams of acrylamide per gram of manganese dioxide.

EXAMPLE V

In this example, which is similar to Example IV, the liquid flow rate was increased to 201.3 milliliters/hour. The reaction was run continuously for 1568.8 hours to afford 3131 grams of acrylamide. The initial conversion was 17.6%, the final value 11.2% and the overall conversion 14.0%. The half-life of the manganese dioxide catalyst was determined to be 4300 grams, that is, 5.7 grams of acrylamide per gram of catalyst.

EXAMPLE VI

A mixture of acrylonitrile, triethylamine and water in a weight ratio of 5.3:1.5:93.2 was utilized as feed solution under the conditions described for Example IV. The liquid flow rate was 93 milliliters/hour and the oxygen flow 5.5 liters/hour. The initial conversion of 15.3% increased to 25.8% after 254 grams of acrylamide had been obtained. The overall conversion was 20.4%.

EXAMPLE VII

A two-inch continuous-flow, stainless steel reactor was filled to a depth of about 20 inches using 2500 grams of granular manganese dioxide catalyst. A solution of 5.3:10:84.7 parts by weight of acrylonitrile, pyridine and water, respectively, was pumped to the reactor at a flow rate of 187 milliliters/hour. Oxygen gas was passed in at a flow rate of 27.5 liters/hour. The apparatus was maintained at 70° C. by circulating hot water in the jacket. The conversion ranged from 37.9% initially to 36.4% after 840.3 hours and 4209 grams of acrylamide was produced. An overall conversion of 37.3% was obtained. The half-life of the manganese dioxide was estimated to be 57,000 grams or 22.8 grams of acrylamide per gram of catalyst.

EXAMPLE VIII

A stainless steel reactor was filled with 750 grams of commercial manganese dioxide and heated at 70° C. An arrangement of solenoid valves and liquid level sensors controlled by a recycling electric timer permitted successively filling the apparatus with liquid, holding the solution in contact with the catalyst for a specified length of time (96 minutes), draining the product solution into an appropriate receiver and sweeping the hot catalyst with a current of air for another time period (60 minutes), then again filling the reaction chamber with fresh solution and repeating the cycle as often as desired.

A 5.3% acrylonitrile and 10% pyridine solution in water was used as the feed mixture. The process was carried out for some 500 cycles. A total of 2036 grams of acrylamide was produced with an overall conversion of 41.0%. The final rate of conversion was 42.6%, having increased from 39.4% initially.

EXAMPLE IX

Example VIII was essentially repeated with the holding time extended to 210 minutes and the air-sweep time shortened to 30 minutes. An overall conversion of 62.6% was achieved. Once again, a slight increase in the rate of conversion was evident after 20 cycles. The holding time was then increased to 330 minutes. The overall conversion for 17 cycles was 76.6% reaching a rate of 82.4% at the time operation was discontinued. A total of 246 grams of acrylamide was produced.

A comparison of Example I with the other numbered examples above shows the advantages of the present invention with respect to the use of oxygen alone and its use in conjunction with amines.

Those modifications and equivalents which fall within the spirit of the invention are to be considered a part thereof.

What is claimed is:

1. In the process of synthesizing the corresponding amide by contacting an aqueous acrylonitrile or methacrylonitrile with manganese dioxide, the improvement which consists in introducing oxygen or an oxygen-containing gas into the nitrile-manganese dioxide contacting zone.

2. A process in accordance with claim 1 wherein an amine is also introduced into the nitrile-manganese dioxide contacting zone.

3. A process in accordance with claim 1 wherein oxygen is employed.

4. A process in accordance with claim 2 wherein the amine is pyridine.

References Cited
UNITED STATES PATENTS

| 3,366,639 | 1/1968 | Haefele | 260—561 N |

FOREIGN PATENTS

| 2,036,126 | 2/1971 | Germany | 260—561 N |

ELBERT L. ROBERTS, Primary Examiner

E. G. LOVE, Assistant Examiner